Dec. 8, 1953  P. B. VANDERLYN  2,662,213
MEANS FOR INDICATING THE LOGARITHMIC VALUE OF A MAGNITUDE
Filed Jan. 19, 1951

Inventor.
PHILIP BARNET VANDERLYN
By Ralph E. Atherton
Attorney

Patented Dec. 8, 1953

2,662,213

UNITED STATES PATENT OFFICE 2,662,213

MEANS FOR INDICATING THE LOGARITHMIC VALUE OF A MAGNITUDE

Philip Barnet Vanderlyn, Ealing, London, England, assignor to Electric & Musical Industries Limited, Hayes, England, a British company Application January 19, 1951, Serial No. 206,792

Claims priority, application Great Britain January 25, 1950

3 Claims. (Cl. 324—120)

This invention relates to means for indicating the logarithmic value of a magnitude and it relates particularly but not exclusively to means for indicating the output of a radio receiver or the like on a logarithmic scale, for example, for the purpose of programme monitoring.

The object of the invention is to provide improved means for indicating the logarithmic value of a magnitude.

According to the invention, means are provided for indicating the logarithmic value of a magnitude comprising means for generating a periodic exponentially varying voltage, voltage comparison means, means for feeding to said comparison means said exponentially varying voltage and a voltage proportional to said magnitude, pulse generating means coupled to said comparison means to generate pulses of a duration commencing with equality between said voltages, and means for feeding said pulses to indicating means to indicate the duration of said pulses.

In order that the said invention may be clearly understood and readily carried into effect, the same will now be more fully described with reference to the accompanying drawings in which.

Figure 1:
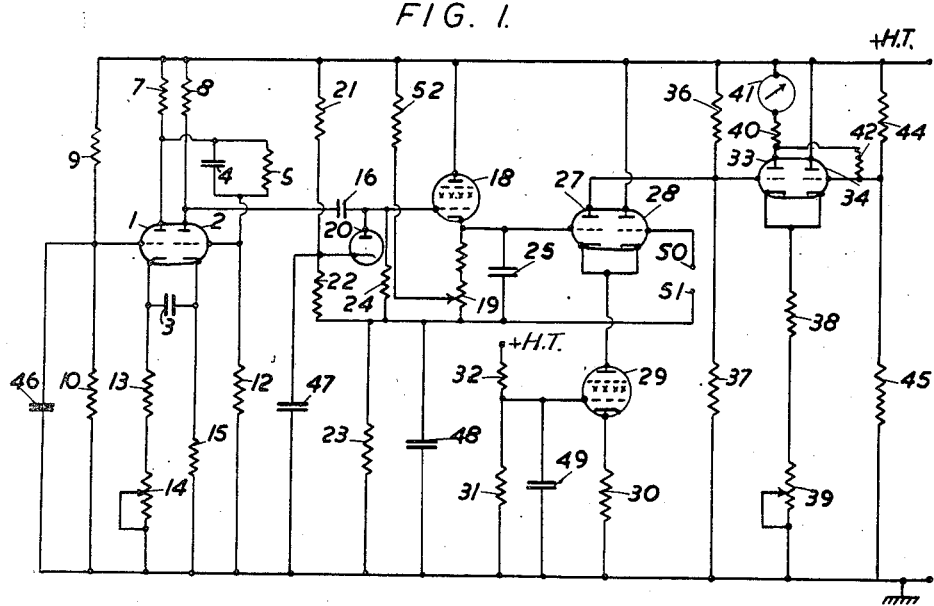
Figure 1 is a diagram of a circuit embodying the invention.

Referring to Figure 1, the circuit shown may be employed, for example, in a radio programme monitor, for indicating the peak level of transmitted sound on a logarithmic scale. The circuit includes an electron discharge tube of the double triode type, comprising triodes 1 and 2, the cathodes of said triodes being coupled by a capacitor 3 and the anode of the triode 1 being connected to the control electrode of the triode 2 via a circuit comprising a capacitor 4 and shunt resistor 5. The anodes of the triodes 1 and 2 are connected to the positive H. T. terminal shown via resistors 7 and 8 respectively. Bias for the triode 1 is obtained from a potentiometer comprising resistors 9 and 10, the junction of which is connected to the control electrode of tube 1. Bias for the control electrode of tube 2 is derived from the potentiometer formed by resistors 7 and 5 and a resistor 12 connected between ground and resistor 5. The cathode of tube 1 is connected to ground via resistors 13 and 14 in series and the cathode of tube 2 is connected to ground via a resistor 15. The elements so far described constitute a cathode coupled multivibrator which is arranged to generate short positive voltage pulses, of for example about 50 volts amplitude at approximately one millisecond intervals. The pulses generated by the multivibrator are applied via a blocking capacitor 16 to the control electrode of an electron discharge tube 18, and a circuit is provided which establishes the positive peaks of the pulses at about 30 volts positive with respect to the lower end of the cathode resistor 19 of tube 18. Said circuit includes a diode 20 the anode of which is connected to the control electrode of tube 18, and the cathode of which is biased by being connected to a suitable point on a potentiometer comprising resistors 21, 22 and 23 connected in series between the positive H. T. terminal and ground. A resistor 24 is connected between the anode of diode 20 and the junction of resistors 22 and 23. The anode of tube 18 is connected directly to the positive H. T. terminal. A capacitor 25 is connected in shunt with resistor 19. The output of tube 18 is taken from across capacitor 25 and is fed to the control electrode of a triode 27 forming part of a double triode electron discharge tube, the other triode of which is indicated by reference numeral 28. The cathodes of triodes 27 and 28 are both connected to the anode of an electron discharge tube 29, the cathode of which is connected to ground via a resistor 30 and the control electrode of which is biased by a voltage derived from a point on the potentiometer formed by resistors 31 and 32 connected in series between ground and the positive H. T. terminal shown. The circuit includes a further double triode electron discharge tube comprising a pair of triodes 33 and 34. The anode of triode 27 is connected to the control electrode of triode 33 and the anode of triode 28 is connected directly to the positive H. T. terminal. A potentiometer formed by resistors 36 and 37 serves to provide suitable bias for the control electrode of triode 33. The cathodes of triodes 33 and 34 are both connected to ground via resistors 38 and 39 in series. The anode of triode 33 is connected via a resistor 40 and a current meter 41 to the positive H. T. terminal, and the anode of triode 34 is connected directly to the positive H. T. terminal. The anode of triode 33 is also coupled to the control electrode of triode 34 by means of resistor 42, the said control electrode being biased by voltage derived from a potentiometer formed by resistors 44 and 45 connected in series between the positive H. T. terminal and ground. Smoothing capacitors 46, 47, 48 and 49 serve to reduce voltage variations at points where such variations are undesirable.

The operation is as follows:

Tube 18 is non-conducting at all times except when the short positive pulses from the anode of tube 2 are applied to its control electrode. When the said pulses are applied and the tube 18 becomes conducting, the voltage generated across cathode resistor 19 produces a charge on capacitor 25, this charge being established relatively rapidly. When the tube 18 becomes non-conducting following the cessation of each pulse the charge leaks away via the cathode resistor 19 and the voltage at the cathode end of resistor 19 falls exponentially. Accordingly a periodic exponentially varying voltage is applied to the control electrode of triode 27. A signal voltage proportional to the magnitude to be indicated, for example the peak level of transmitted sound, is applied between terminals 50 and 51, so that the voltage of the control electrode of tube 28 with respect to terminal 51 is proportional to said magnitude. It is arranged that the maximum value of the voltage of the control electrode of triode 28 is less than the maximum voltage of the exponential waveform of the voltage applied to the control electrode of triode 27. The sum of the currents through triodes 27 and 28 is substantially constant and equal to the anode current of tube 29, the said anode current being determined by the potential of the control electrode of tube 29 and the value of the cathode resistor 30. Triodes 27 and 28 serve to compare the exponential voltage with the signal voltage of the control electrode of triode 28, i. e. with the above-mentioned magnitude. During the initial part of each cycle of the exponential voltage the voltage of the control electrode of triode 27 is higher than that of the control electrode of triode 28 and accordingly the anode current of tube 29 passes through triode 27. The voltage of the control electrode of triode 27 then falls in an exponential manner until it becomes less than the voltage of the control electrode of triode 28, and thereupon the anode current of tube 29 passes through triode 28 instead of through triode 27. Accordingly, the voltage at the anode of the triode 27 rises, for example from 190 volts to 220 volts. The time required for this change in voltage of triode 27 is equal to the time taken for the exponential voltage to fall through the range of voltages required to cause the current to flow wholly through triode 28 instead of through triode 27. Triodes 33 and 34 form a multivibrator in which no current flows through the triode 33 when its control electrode is at the initial voltage of the anode of triode 27, for example 190 volts, but when the said anode voltage rises to about 210 volts the multivibrator switches over and all current flows through triode 33, the instant at which the multivibrator switches over being that at which the exponential voltage is substantially equal to the signal voltage of the control electrode of tube 28. The multivibrator comprising the tubes 33 and 34 has thus two stable conditions in which the tubes are alternately conducting. During the time that triode 33 is conducting, current flows through the meter 41, and accordingly current flows in meter 41 so long as the exponential voltage is less than the said signal voltage between terminals 50 and 51. Upon each application of a pulse to the control electrode of tube 18 the exponential voltage rises rapidly and the circuit is restored to its original condition, and current ceases to flow in meter 41 until the exponential voltage again falls to the value of the voltage between terminals 50 and 51. The current in meter 41 thus consists of pulses having a constant amplitude determined by the resistances 38 and 39 and lasting from the time at which the exponential voltage is equal to the signal voltage of tube 28 until the completion of a cycle of operation of the multivibrator triodes 1 and 2. The frequency of the pulses is such that the meter reading does not vary at each pulse but is proportional to the mean current flowing through the meter. The time taken for the circuit to be restored to its original condition by each pulse from the multivibrator 1, 2 is short compared with the time of a complete cycle of operations and the effect on the current in the meter 41 can be neglected to a first approximation.

Figure 2:
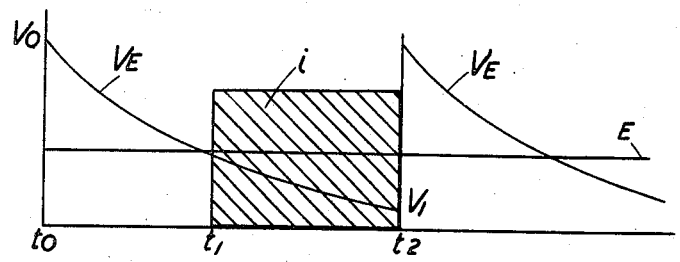
Figure 2 is a diagram illustrating the operation of the circuit of Figure 1.

Referring now to Figure 2, wherein voltage is plotted against time, E represents the signal voltage between terminals 50 and 51, and $V_E$ represents the exponentially varying voltage applied to the control electrode of triode 27. $V_0$ represents the initial value of the exponential voltage at time $t_0$ and $V_1$ represents the value of the exponential voltage at the instant when a pulse is about to be applied to tube 18 $t_2-t_0$ representing the time of a complete cycle of the exponential waveform. The shaded area $i$ represents the constant current flowing through the meter 41 between the times $t_1$ and $t_2$, $t_1$ being the time at which the exponential voltage $V_E$ is equal to the voltage E. It can be shown that the mean current $i_m$ through triode 33 and therefore the mean current through meter 41, is given by:

$$i_m = i \frac{CR}{t_2-t_0} \cdot \log \frac{E}{V_1}$$

that is to say the meter reading is proportional to the logarithm of the signal voltage of triode 28, said voltage being proportional to the magnitude concerned.

In the above equation CR is the time constant of the capacitor 25 and resistor 19 and the logarithmic range of voltage over which the circuit operates is dependent on the ratio $$\frac{CR}{t_2+t_0}$$

For purposes of calibration therefore the repetition period $t_2-t_0$ is arranged to be variable and for this purpose resistor 14 is adjustable as shown. An adjustable tapping on resistor 19 is connected to the positive H. T. terminal via a resistor 52. Adjustment of the said tapping enables the voltage to which the exponential waveform is asymptotic to be varied for the purpose of removing the effect of contact potential in the rectifier circuit from which voltage E is derived. The current in meter 41 at maximum indication is determined by adjusting the value of resistor 39.

There will be a small constant current at all times through meter 41 via resistors 40, 42 and 45. This current does not affect the operation of the circuit, but if desired can easily be avoided by means well known in the art.

The circuit illustrated is suitable for use with a single H. T. supply and may conveniently be employed in portable equipment.

A circuit according to the invention may have application to computing apparatus. For example, division and multiplication may be effected, by applying the outputs of two such circuits to an electrical subtracting or adding circuit as the case may be.

I claim:

1. Means for indicating the logarithmic value of a magnitude, comprising means for generating a periodic exponentially varying voltage, voltage comparison means, means for feeding to said comparison means said exponentially varying voltage and a voltage proportional to said magnitude, pulse generating means coupled to said comparison means to generate pulses of a duration commencing with equality between said voltages, indicating means, and means for feeding said pulses to said indicating means to indicate the duration of said pulses.

2. Means for indicating the logarithmic value of a magnitude, comprising means for generating a periodic exponentially varying voltage, a pair of electric discharge tubes each having a control electrode, a common cathode circuit for said tubes, means for applying said periodic voltage to the control electrode of one of said tubes, means for applying a voltage proportional to said magnitude to the control electrode of said other tube, means to maintain one of said tubes conducting and the other nonconducting, means for changing the conducting conditions of said tubes when said voltages applied to said tubes are equal, means for deriving an output voltage from one of said tubes, and means for producing from said output voltage, pulses of duration determined by the change in the conducting conditions of said tubes, indicating means, and means for feeding said pulses to said indicating means to indicate the duration of said pulses.

3. Means according to claim 2, said means for producing said pulses comprising a multivibrator having a pair of electron discharge tubes each provided with a control electrode, means for maintaining said multivibrator in two stable conditions with one of the tubes thereof conducting and the other tube thereof nonconducting, means for applying said output voltage to the control electrode of one of the tubes of said multivibrator, and means including said indicating means in the anode circuit of one of the tubes of said multivibrator.

PHILIP BARNET VANDERLYN.

References Cited in the file of this patent

UNITED STATES PATENTS

| Number | Name | Date |
|---|---|---|
| 2,496,723 | Hipple | Feb. 7, 1950 |